(12) United States Patent
Rateick, Jr. et al.

(10) Patent No.: US 11,921,046 B2
(45) Date of Patent: Mar. 5, 2024

(54) FILTER MEDIA AND SYSTEM USING THE SAME

(71) Applicant: Honeywell International Inc., Charlotte, NC (US)

(72) Inventors: Richard George Rateick, Jr., South Bend, IN (US); Christopher Evans, Granger, IN (US); Bahram Jadidian, Watchung, NJ (US); Mahdi Mohajeri, Morristown, NJ (US); Mehrad Mehr, Raleigh, NC (US)

(73) Assignee: Honeywell International Inc., Charlotte, NC (US)

( * ) Notice: Subject to any disclaimer, the term of this patent is extended or adjusted under 35 U.S.C. 154(b) by 452 days.

(21) Appl. No.: 17/008,290

(22) Filed: Aug. 31, 2020

(65) Prior Publication Data
US 2022/0065789 A1 Mar. 3, 2022

(51) Int. Cl.
*B01D 46/00* (2022.01)
*B01D 39/20* (2006.01)
(Continued)

(52) U.S. Cl.
CPC ......... *G01N 21/65* (2013.01); *B01D 39/2051* (2013.01); *G01J 3/0229* (2013.01);
(Continued)

(58) Field of Classification Search
CPC .... B01D 46/00; B01D 46/0001; B01D 46/10; B01D 46/24; B01D 46/2403; B01D 46/2418; B01D 46/2429; B01D 46/2425; B01D 46/2451; B01D 46/2486; B01D 39/00; B01D 39/10; B01D 39/12; B01D 41/00; B01D 41/04; B01D 69/06; B01D 71/02; B01D 71/022; B01D 71/0221; B01D 71/0223; B01D 71/028; B01D 2239/0258; B01D 2239/04; B01D 2239/0407;
(Continued)

(56) References Cited

U.S. PATENT DOCUMENTS 6,350,488 B1 2/2002 Lee et al.
7,815,806 B2 10/2010 Cooper et al.
(Continued)

FOREIGN PATENT DOCUMENTS

WO 2010/126686 A2 11/2010
WO 2020/123974 A1 6/2020

OTHER PUBLICATIONS

Science Direct, Advanced Power Plant Materials, Design and Technology, Definition of Gamma Prime, 2010 (Year: 2010).*
(Continued)

*Primary Examiner* — Allison G Fitzsimmons
(74) *Attorney, Agent, or Firm* — Shumaker & Sieffert, P.A.

(57) ABSTRACT

In some examples, a method of making a filter includes heating a metal substrate to precipitate a first phase on a surface of the metal substrate from a metal alloy, the metal substrate defining a plurality of apertures configured to allow a gas to pass through the apertures. The metal substrate is the metal alloy including a first metal and a second metal. The method further includes growing a plurality of carbon nanotubes (CNTs) on the surface of the first metal of the first phase, and the CNTs are configured to capture at least one particle.

20 Claims, 11 Drawing Sheets

(51) Int. Cl.
    G01J 3/02      (2006.01)
    G01J 3/44      (2006.01)
    G01N 21/65     (2006.01)
    B01D 39/00     (2006.01)
(52) U.S. Cl.
    CPC .......... G01J 3/44 (2013.01); B01D 2239/025
         (2013.01); B01D 2239/0442 (2013.01); B01D
              2239/0471 (2013.01); B01D 2239/1216
                                            (2013.01)
(58) Field of Classification Search
    CPC .... B01D 2239/0414; B01D 2239/0471; B01D
                      2239/0478; B01D 2239/10; B01D
              2253/00; B01D 2253/10; B01D 2253/102;
              B01D 2253/112; B01D 2253/1122; B01D
                         2253/1124; B01D 2279/00; B01D
                               2279/65; B01D 2279/40
    See application file for complete search history.

(56) References Cited

U.S. PATENT DOCUMENTS

| | | | |
|---|---|---|---|
| 10,580,591 | B2 | 3/2020 | Wang et al. |
| 10,598,575 | B2 | 3/2020 | Zheng et al. |
| 2004/0007528 | A1 | 1/2004 | Bakajin et al. |
| 2012/0037280 | A1 | 2/2012 | Devaux |
| 2017/0165612 | A1* | 6/2017 | Dastgheib ............... C02F 1/444 |

OTHER PUBLICATIONS

Heanjia, "Nickel Based Alloys-Phases and Corrosion Resistance", Screenshot with Date (Year: 2015).*
Heanjia, "Nickel Based Alloys-Phases and Corrosion Resistance" (Year: 2015).*
Oxidation of Hastelloy C276; AIP Conference Proceedings 614, 495-502 (2002) https://doi.org/10.1063/1.1472578 (Year: 2002).*
Silva et al., J. Mater. Chem. A, 2015, 3, 17804-17810; DOI: 10.1039/C5TA03734D (Paper) (Year: 2015).*
Belmonte et al., "Directional Electrical Transport in Tough Multifunctional Layered Ceramic/Graphene Composites," Advanced Electronic Materials, vol. 1, No. 9, Aug. 2015, 7 pp.
Belmonte et al., "Nitrogen-doped-CNTs/Si3N4 nanocomposites with high electrical conductivity," Journal of the European Ceramic Society, vol. 34, No. 5, May 2014, 29 pp.
Bianco et al., "A carbon science perspective in 2018: Current achievements and future challenges," Carbon, Elseiver, available online Feb. 21, 2018, 17 pp.
Boehm et al., "Surface Properties of Extremely Thin Graphite Lamellae," Fifth Carbon Conference, Sep. 15, 1961, 8 pp.
Chhowalla et al., "Two-dimensional semiconductors for transistors," Materials Science & Engineering, published online Aug. 17, 2016, 15 pp.
Cruz-Silva et al., "Super-stretchable Graphene Oxide Macroscopic Fibers with Outstanding Knotability Fabricated by Dry Film Scrolling," ACS Nano, vol. 8, No. 6, May 5, 2014, 9 pp.
Eklund et al., "Raman scattering from in-plane lattice modes in low-stage graphite-alkali-metal compounds*," Physical Review B, vol. 16, No. 8, Oct. 15, 1977, 4 pp.
Fitzgibbons et al., "Benzene-derived carbon nanothreads," Nature Materials, vol. 14, Jan. 2015, 6 pp.
Folng et al., "Detection of two interstellar absorption bands coincident with spectral features of C+60," Nature Publishing Group, vol. 369, May 26, 1994, 3 pp.
Hastings, C., "Handheld Device to Capture and Identify Viruses in Minutes," Medgadget, Inc., Jan. 2020, 3 pp. Accessed at https://www.medgadget.com/2020/01/handheld-device-to-capture-and-identify-viruses-in-minutes.html on Aug. 26, 2020.
Korves et al., "Detection of respiratory viruses on air filters from aircraft," Letters in Applied Microbiology, vol. 53, Jun. 2011, 7 pp.
Kvashnin et al., "Phase Diagram of Quasi-Two-Dimensional Carbon, From Graphene to Diamond," Nano Letters, American Chemical Society, published Jan. 17, 2014, 6 pp.
Liu et al., "Van der Waals heterostructures and devices," Nature Reviews, published online Jul. 12, 2016, 17 pp.
Lv et al., "Building Complex Hybrid Carbon Architectures by Covalent Interconnections: Graphene—Nanotube Hybrids and More," ACS Nano, vol. 8, No. 5, May 5, 2014, 9 pp.
Lv et al., "Large-Area Si-Doped Graphene: Controllable Synthesis and Enhanced Molecular Sensing," Advanced Materials, Wiley Online Library, published online Oct. 29, 2014, 7 pp.
Novoselov et al., "2D materials and van der Waals heterostructures," Applied Physics, vol. 353, Issue 6298, Jul. 29, 2016, 13 pp.
Novoselov et al., "Electric Field Effect in Atomically Thin Carbon Films," Science, vol. 306, Oct. 22, 2004, 4 pp.
Pal et al., "Importance of Cr2O3 layer for growth of carbon nanotubes on superalloys," Carbon, vol. 48, No. 3, Mar. 2010, 10 pp.
Ramirez et al., "Extraordinary toughening enhancement and flexural strength in Si3N4composites using graphene sheets," ELSEVIER, Aug. 29, 2013, 9 pp.
Rao et al., "Diameter-Selective Raman Scattering from Vibrational Modes in Carbon Nanotubes," Science, vol. 275, Jan. 10, 1997, 5 pp.
Terrones et al., "Graphene and graphite nanoribbons: Morphology, properties, synthesis, defects and applications," Elsevier, accepted Jun. 28, 2010, 22 pp.
Varela-Rizo et al., "Hybrid Films with Graphene Oxide and Metal Nanoparticles Could Now Replace Indium Tin Oxide," vol. 6, No. 6, ACS Nano, Jun. 11, 2012, 8 pp.
Wu et al., "Three-dimensionally bonded spongy graphene material with super compressive elasticity and near-zero Poisson's ratio," Nature Communications, Jan. 20, 2015, 9 pp.
Xiong et al., "Flame-Synthesis of Carbon Nanotube Forests on Metal Mesh Structure: Dependence, Morphology, and Application," Nanomaterials, vol. 9, No. 9, Sep. 2019, 13 pp.
Xu et al., "Ultrastrong Fibers Assembled from Giant Graphene Oxide Sheets," Advanced Materials, Oct. 9, 2012, 6 pp.
Yeh et al., "A rapid and label-free platform for virus capture and identification from clinical samples," Proceedings of the National Academy of Sciences of the United States of America (PNAS), vol. 117, No. 2, Jan. 2020, 7 pp.
Yeh et al., "Tunable and label-free virus enrichment for ultrasensitive virus detection using carbon nanotube arrays," Science Advances, Oct. 7, 2016, 14 pp.
Ashraf et al., "Robust carbon nanotube membranes directly grown on Hastelloy substrates and their potential application for membrane distillation", Carbon, Elsevier Oxford, GB, vol. 106, May 10, 2016, pp. 243-251, KP029569045, ISSN: 0008-6223, DOI: 10.1016/J.CARBON.2016.05.016.
Baddour et al., "A simple thermal CVD method for carbon nanotube synthesis on stainless steel 304 without the addition of an external catalyst", Carbon, Elsevier Oxford, GB, vol. 47, No. 1, Nov. 7, 2008, pp. 313-318, KP025715623, ISSN: 0008-6223, DOI: 10.1016/J.CARBON.2008.10.038.
Extended Search Report from counterpart European Application No. 21191160.7 dated Jan. 18, 2022, 8 pp.
Vicentini et al., "Highly stable nickel-aluminum alloy current collectors and highly defective multi-walled carbon hanotubes active material for neutral aqueous-based electrochemical capacitors", Journal of Energy Storage, NL, vol. 23, Mar. 18, 2019, pp. 116-127, XP055876873, ISSN: 2352-152X, DOI: 10.1016/j.est.2019.01.013.
Response to Extended Search Report dated Jan. 18, 2022, from counterpart European Application No. 21191160.7 filed Apr. 7, 2022, 10 pp.

* cited by examiner

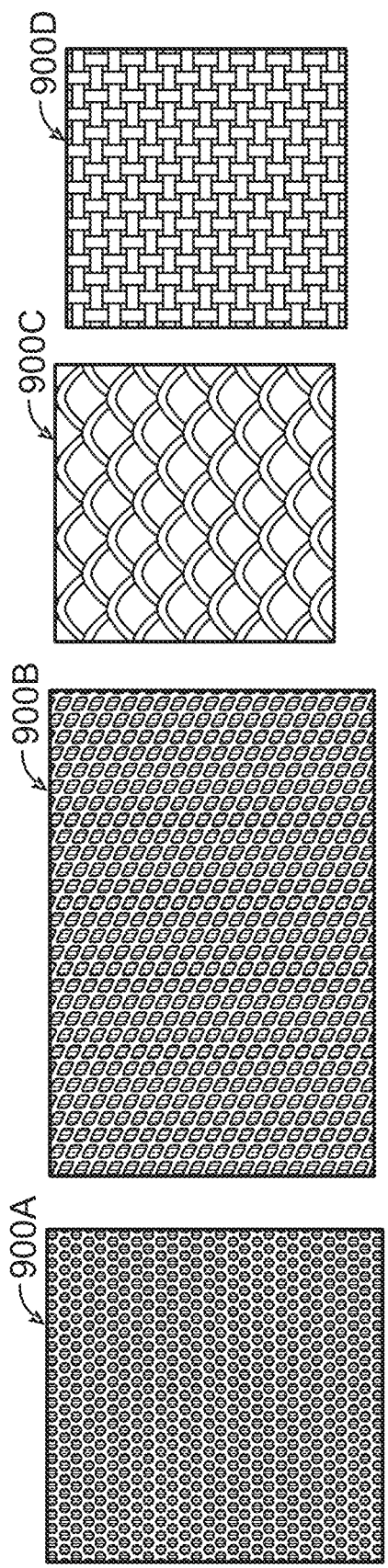
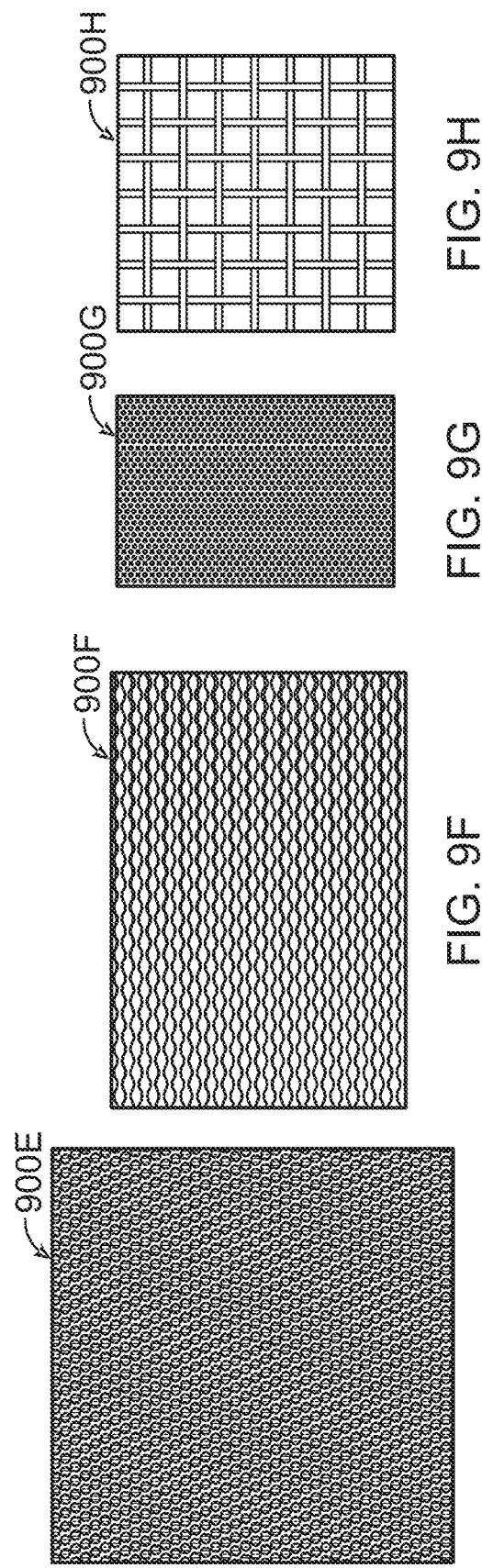

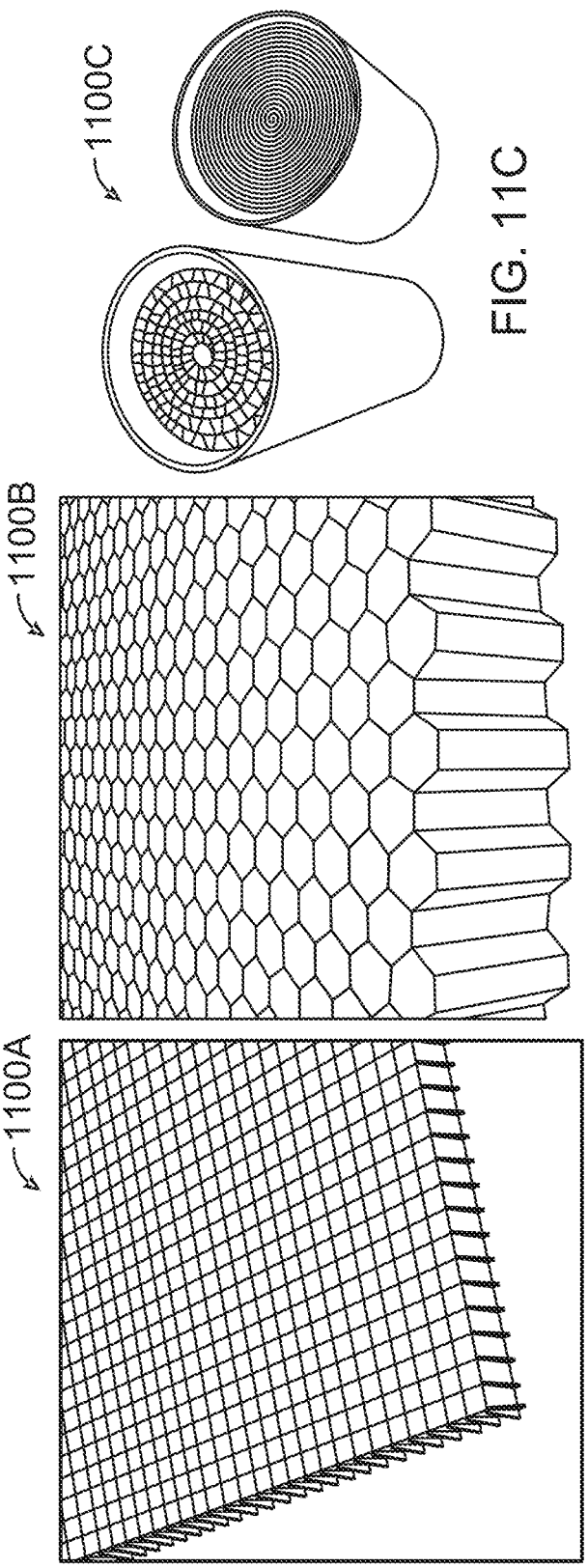

FILTER MEDIA AND SYSTEM USING THE SAME

TECHNICAL FIELD

The present disclosure relates to filter systems.

BACKGROUND

A filter may be composed of a fibrous or porous material and may remove particulates from a gas stream, such as air, passing through the filter. Particulate matter, including dust, hair, allergens, pathogens, and the like, larger than the pores of the filter may be trapped by filter media. The efficiency of removal of particulate matter by a filter depends on the size of the particulate matter, the pore size and/or pore size distribution of the filter media, and the velocity of the flow of the gas.

SUMMARY

In some examples, the disclosure describes a method of making a filter, the method comprising: heating a metal substrate to precipitate a first phase on a surface of the metal substrate from a metal alloy, wherein the metal substrate defines a plurality of apertures configured to allow a gas to pass through the apertures, wherein the metal substrate comprises the metal alloy, wherein the metal alloy comprises a first metal and a second metal; and growing a plurality of carbon nanotubes (CNTs) on the surface of the first metal of the first phase, wherein the CNTs are configured to capture at least one particle.

In some examples, the disclosure describes a filter comprising: a metal substrate defining a plurality of apertures configured to allow a gas to pass through the apertures, the metal substrate comprising a metal alloy, the metal alloy comprising a first metal and a second metal; and a plurality of carbon nanotubes (CNTs) grown on the surface of a first phase of the metal substrate, the plurality of carbon nanotubes configured to capture at least one particle contained in the gas passing through the metal substrate.

In some examples, the disclosure describes a method of detecting a pathogen, the method comprising: capturing a pathogen via a filter from a volume of gas flowing through the filter, the filter comprising: a metal substrate defining a plurality of apertures configured to allow the gas to pass through the apertures, the metal substrate comprising a metal alloy, the metal alloy comprising a first metal and a second metal; and a plurality of carbon nanotubes on the surface of a first phase of the metal substrate, the plurality of carbon nanotubes configured to capture a pathogen; and detecting, via a detector, the at least one pathogen captured by the filter.

In some examples, the disclosure describes a system for detecting a pathogen, the system comprising: a housing comprising: an inlet configured to allow a gas to enter a conduit in fluid communication with the inlet and configured to define a flow path for the gas within the housing; and an outlet in fluid communication with the conduit and configured to allow the gas to exit the housing; a filter in fluid communication with conduit and configured to capture the pathogen, the filter comprising: a metal substrate defining a plurality of apertures configured to allow a gas to pass through the apertures, the metal substrate comprising a metal alloy, the metal alloy comprising a first metal and a second metal; and a plurality of carbon nanotubes (CNTs) on the surface of a first phase of the metal substrate, the plurality of carbon nanotubes configured to capture a virus; and a sensor configured to detect the virus captured by the filter.

The details of one or more examples are set forth in the accompanying drawings and the description below. Other features, objects, and advantages will be apparent from the description and drawings, and from the claims.

BRIEF DESCRIPTION OF THE DRAWINGS

The details of one or more examples are set forth in the accompanying drawings and the description below. Other features, objects, and advantages will be apparent from the description and drawings, and from the claims.

FIGS. 9A-9H illustrate example two-dimensional (2D) metal mesh CNT filters, in accordance with examples of the present disclosure.

FIGS. 11A-11D are perspective views of example 2D metallic open cell foam CNT filters, in accordance with examples of the present disclosure.

DETAILED DESCRIPTION

Figure 1:
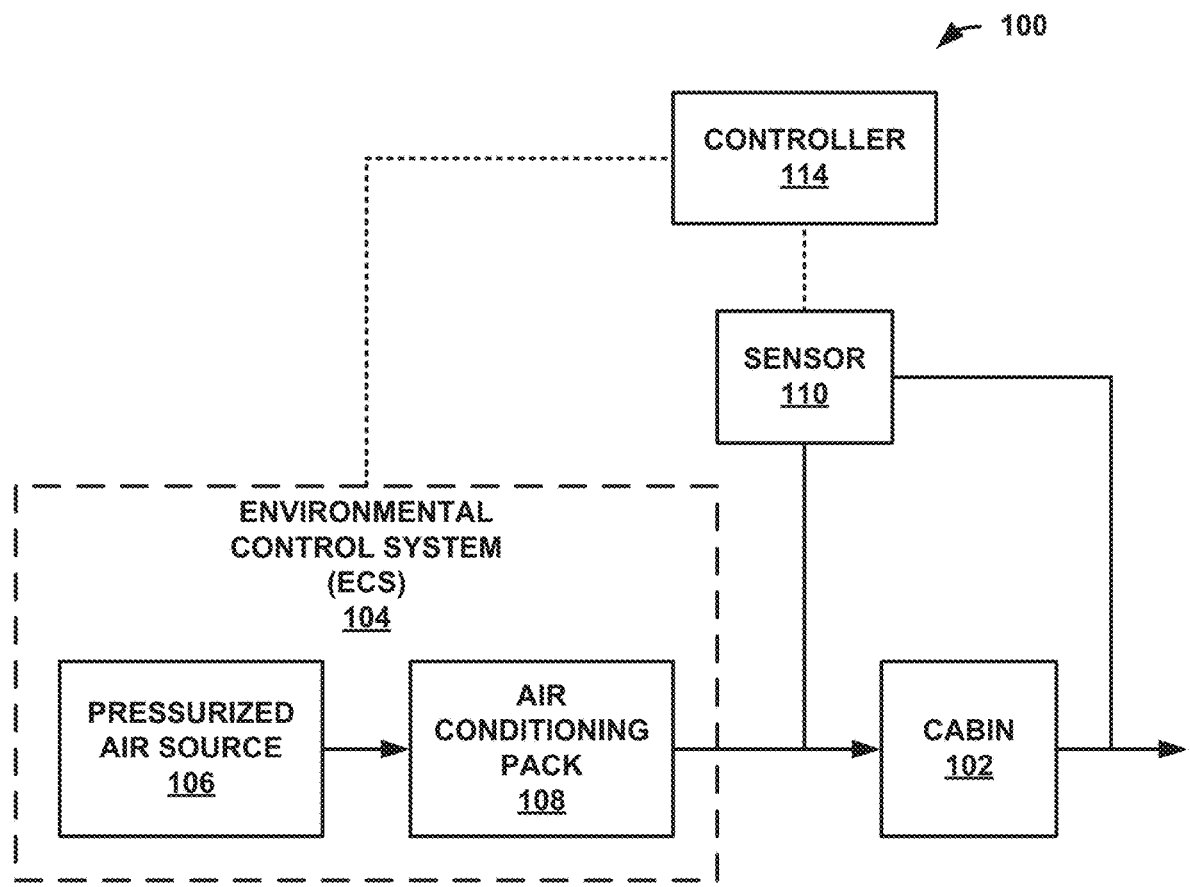
FIG. 1 is a diagram illustrating an example system for detecting a particle in pressurized air of a cabin of an aircraft using an example carbon nanotube (CNT) filter in accordance with examples of the present disclosure.

In some examples, this disclosure relates to filters and systems for detecting filter-captured particles. As described below, an example filter may include a metal substrate, such as a two-dimensional (2D) metal mesh substrate, a 2D metallic open cell foam, or a three-dimensional (3D) metallic open cell foam substrate, including a plurality of CNTs on the surface of the metal substrate. The metal substrate may be formed of a metal alloy. The metal substrate may be heated to precipitate out or otherwise cause the formation of multiple phases from the metal alloy. A phase formed by the heating may serve as one or more sites on the metal substrate onto which the CNTs may be grown, captured, or otherwise attached to the sites, e.g., chemical vapor deposition (CVD) or other suitable process for growing and/or attaching CNTs. The metal substrate of the filter may have aperture sizes large enough to allow a gas, such as air, to pass through the filter without a significant pressure drop, and the CNTs may be patterned, sized, and have aperture and/or pore sizes configured to capture particulate matter, such as dust, hair, allergens, pathogens, e.g., bacteria and viruses, and the like.

Examples of the filter may be employed in a sensor system that is configured to determine the presence and/or amount of captured particles, e.g., a virus, on the filter. For example, the presence and/or amount of a virus captured by the filter may be detected via Raman spectrometry. As described below, the metal substrate may be formed such that CNTs grown on the metal substrate can withstand heating of the metal substrate, and the metal substrate may be heated so as to destroy filter-captured particles. For example, the metal substrate may be heated (e.g., periodically) to destroy the captured particles, e.g., clean the filter.

In some examples, a system may substantially remove particles from a volume of gas, such as organic matter, bacteria particles, virus particles, and the like, via filtration using the filter. For example, a volume of gas may be recirculated through the filter and the metal substrate may be heated so as to destroy filter-captured particles and substantially remove the particles from the volume of gas.

With the Covid-19 virus causing massive disruptions in many industries, such as commercial aviation, a means of detecting the potential for infection is needed at the individual person level and at the level of an enclosed volume, such as the cabin of an aircraft or interior of a building. Detecting infected people before boarding plane or entering a building, as well as detecting air contamination during a flight or while someone is in a building, can go a long way to instilling confidence that air travel, visiting restaurants and public buildings, and the like, is safe.

In examples, CNTs may be used to filter viruses, e.g., capture viruses, and Raman spectrometry may be used to detect captured viruses. In some examples, a sensor may include a CNT filter and a sensor for testing individuals and/or a volume of a gas. For example, a CNT filter and a sensor may be housed in a handheld device. A person may breathe into the device and if the signature of a virus or viruses is detected, the device operator would be advised.

In another example, a CNT filter and sensor may be located in an air management system, such as a building heating, ventilation, and air conditioning (HVAC) system, a vehicle cabin air management system, an environmental control system (ECS), and the like. A pump may draw a controlled flow of air through the filter, taking an aliquot from the full gas stream. The flow of air may be periodically or continuously analyzed, e.g., via filtering and detection, for the presence and/or amount of a virus or viruses captured by the filter element. A titer of a virus or viruses may be determined based on detection of the virus or viruses. In some examples, a relative risk of virus exposure for individuals exposed to air managed by the air management system, e.g., passengers on the flight, occupants within the building, etc., may be determined based on detection of the virus or viruses. Information related to detection of a virus may be communicated in real time, for example, to a building manager or security, local emergency responders (police and/or fire departments), to an airline, an appropriate agency such as an airport or the federal aviation administration, etc. Appropriate measures could be taken to mitigate further exposure and transmission of the virus(es), e.g., evacuation of a building and further testing of the occupants, isolation and further testing of flight passengers upon arrival, diversion of the flight to a more suitable airport, and the like.

In some CNT technologies, CNTs may be grown and/or deposited on a catalyst. For example, iron nanoparticles may be a CNT catalyst and may be deposited onto the surface of a support structure, e.g., a substrate, and may be growth and/or deposit sites for CNTs. However, nanoparticles may have associated health and safety risks. For example, a nanoparticle catalyst may not have sufficient adhesion to the substrate, such that the nanoparticle catalyst and CNTs may detach from the substrate. Detachment of the nanoparticle catalyst from the substrate may be exacerbated by heating the substrate.

In some examples, a CNT filter may be formed by forming growth sites on a substrate that may be integral to the substrate itself. For example, a CNT filter may be formed by forming CNT growth sites as an integral part of the structure of a metal alloy substrate by precipitating a phase of the metallic alloy including a catalytic metal of the alloy and etching the phase to expose the catalytic metal. Such a CNT filter may significantly reduce detachment of the catalyst and/or CNTs, thereby reducing health and safety risks associated with detachment of CNTs from the substrate. Additionally, such a filter may reduce health and safety risks by the use of a solid metallic substrate, such as a mesh and/or open cell foam, for deposition of the CNTs rather than using nanoparticles bonded onto a metallic substrate.

For example, a CNT filter may be constructed using a nickel-aluminum alloy, Alloy 10, or any other suitable metal. In some examples, a solid solution alloy may be etched to remove aluminum, leaving a highly active nickel surface that may be suitable to catalyze growth of carbon nano tubes, such as during CVD coating in a hydrocarbon vacuum atmosphere at elevated temperature. Nickel has the advantage of being corrosion resistant and forming a superior bond to the CNTs as compared to iron. In some examples, cobalt alloys may be used rather than nickel alloys. Additionally, the superior bond/adhesion of CNTs to nickel and or cobalt enable heating of the mesh without debonding the CNTs, e.g., heating the metal substrate so as to destroy filter captured particles, such as a virus.

FIG. 1 is a diagram illustrating an example system 100 for detecting a particle in pressurized air of a cabin 102 of an aircraft using an example CNT filter in accordance with examples of the present disclosure. Cabin 102 includes an internal environment that houses occupants. Although the example shown illustrates an aircraft cabin and an aircraft ECS, system 100 may be used with any volume and air or gas management system, such as a building and a building HVAC system. Furthermore, system 100 may be used in a device with or without an air or gas management system, for example, as a handheld device further described below. For example, a user, such as an aircraft passenger, may breathe into a device housing system 100 and if a particle, such as a pathogen, is detected, the user and/or an operator would be alerted. In some examples, a handheld device including system 100 may be used as a screening device, such as before boarding an airplane or entering a building.

System 100 includes an environmental control system (ECS) 104. ECS 104 is configured to supply clean, pressurized air to cabin 102. ECS 104 includes at least one pressurized air source 106. Pressurized air source 106 is configured to generate pressurized air for use in cabin 102. For example, when the aircraft is on the ground, air pressure outside the aircraft may be similar to or the same as air pressure within cabin 102. However, once the air is at higher elevations, the air pressure outside the aircraft may be significantly lower than an air pressure required for cabin 102, such that pressurized air source 106 may supply cabin 102 with pressurized air. Pressurized air source 106 may include a variety of air sources including, but not limited to, a bleed air source (e.g., one or more compression stages of a gas turbine engine), a load compressor (e.g., driven directly by an auxiliary power unit), a stand-alone pressurized air source as cabin air compressors (e.g., driven by electricity from an auxiliary power unit), or any other air source capable of supplying air with a sufficiently high pressure so as to pressurize cabin 102. ECS 104 includes at least one air conditioning pack 108. In the process of compressing the air, pressurized air source 106 may heat the air to a relatively high temperature that is not suitable for direct discharge into cabin 102. Air conditioning pack 108 is configured to receive pressurized air from pressurized air source 106 and cool the pressurized air. In addition, air conditioning pack 108 may include air filtration and/or gas contaminant removal systems.

System 100 includes at least one particle sensor 110. Particle sensor 110 is configured to detect the presence of and/or amount of one or more particles a concentration of a gas contained within air flowing into or out of cabin 102. Particle sensor 110 may be configured to detect the concentration of gas contaminants, such as a virus, during flight at different elevations or flight levels, and/or while the aircraft is on the ground. Generally, particle sensor 110 may be configured and/or positioned at any location sufficient to provide an accurate representation of the amount of one or more particles in cabin 102. In some examples, particle sensor 110 includes a CNT filter comprising a metal substrate defining a plurality of apertures and/or pores and a plurality of CNTs on the metal substrate configured to capture particles, such as a virus. For example, particle sensor 110 may include a CNT filter comprising a metal substrate comprising a metal alloy of, for example, nickel and aluminum. A plurality of CNTs may be grown on the surface of a first phase of the metal substrate and configured to capture particles, e.g., based on particle size, contained in the gas passing through the metal substrate apertures.

System 100 includes controller 114. Controller 114 is communicatively coupled particle sensor 110 and ECS 104 and may be configured to receive a signal from particle sensor 110 related to particle detection and send control signals to one or more systems of ECS 104, such as pressurized air source 106 and/or air conditioning pack 108. Controller 114 may include any of a wide range of devices, including processors, e.g., one or more microprocessors, one or more application specific integrated circuits (ASICs), one or more field programmable gate arrays (FPGAs), or any other equivalent integrated or discrete logic circuitry, as well as any combinations of such components, servers, desktop computers, notebook (i.e., laptop) computers, tablet computers, and the like.

Controller 114 is configured to control ECS 104 to maintain adequate conditions within the internal environment of cabin 102, such as for personal comfort or required by law or industry standard. For example, controller 114 may be configured to control a pressure, temperature, humidity, air flow rate, or other ambient conditions of cabin 102 at various aircraft conditions, such as ground operation, passenger loading, take-off, cruising, descent, and landing. Controller 114 may be configured to control ECS 104 to supply clean, pressurized air to cabin 102.

Controller 114 is configured to receive particle detection data from particle sensor 110. Controller 114 may determine the presence and/or amount of a particle based on the detection data that includes a concentration tolerance of particle sensor 110. Controller 114 may be configured to determine whether a detected particle of a contaminant in cabin 102 exceeds a concentration threshold. The concentration threshold may correspond to a maximum allowed particle-concentration for the particular contaminant. Controller 114 may be configured to generate and alert and/or an alert signal based on detection of a particle and/or based on detection of a concentration of a particle that exceeds the concentration threshold.

In response to determining that the particle-concentration detection exceeds the particle-concentration threshold, controller 114 may be configured to control one or more contaminant removal system, e.g., via air conditioning pack 108. For example, in response to determining that the virus-concentration of a virus exceeds a virus threshold in the cabin, controller 114 may cause cabin air to be recirculated through a contaminant removal system.

Figure 2:
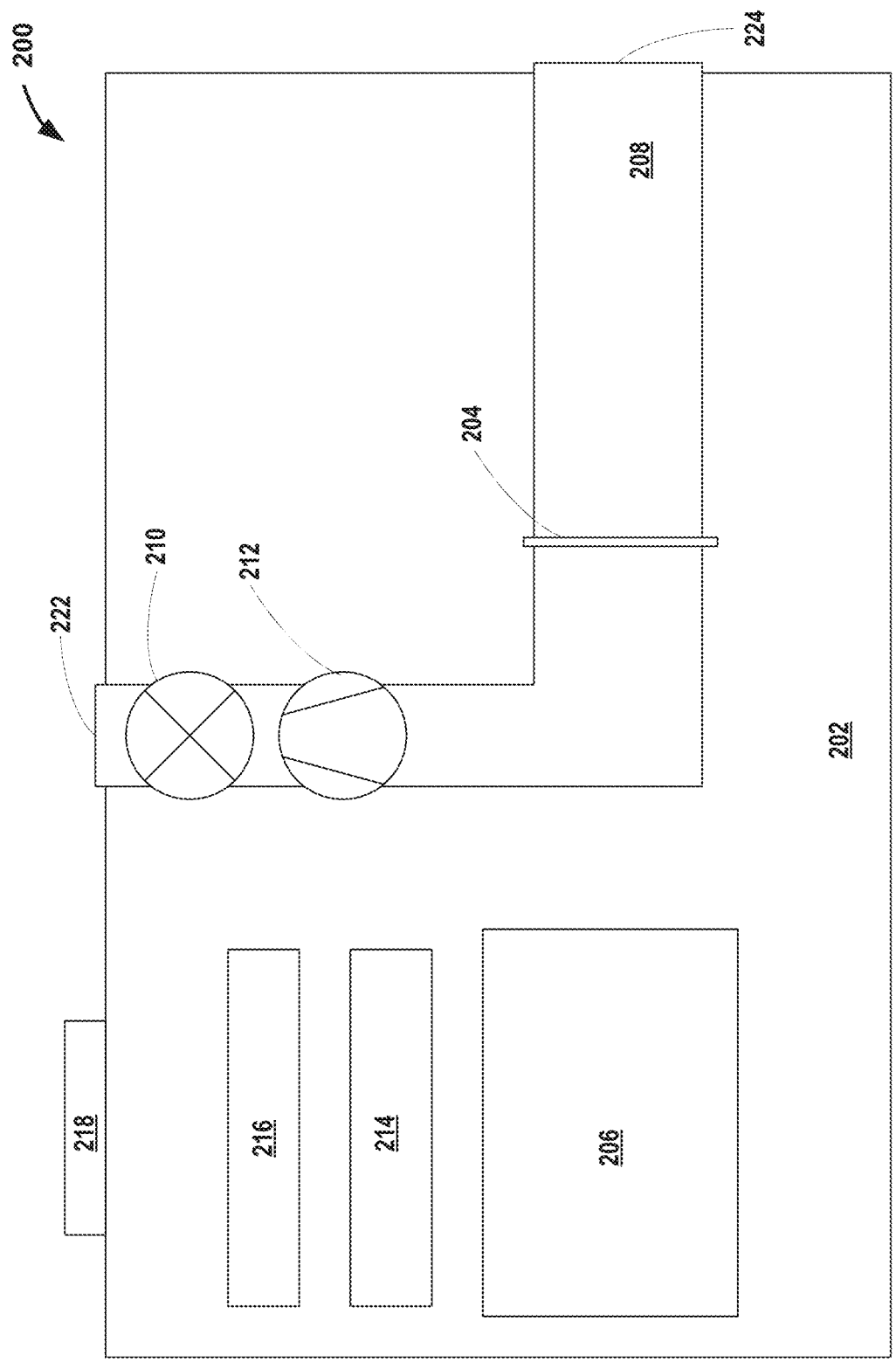
FIG. 2 is a diagram illustrating an example sensor including an example CNT filter in accordance with examples of the present disclosure.

FIG. 2 is a diagram illustrating an example particle sensor 200, in accordance with examples of the present disclosure. In the example shown, particle sensor 200 includes housing 202, filter 204, and sensor 206.

In the example shown, housing 202 may include filter 204, sensor 206, gas conduit 208, valve 210, pump 212, controller 214, interface 216, and connector 218. Housing 202 may provide structure for mounting and positioning filter 204, sensor 206, gas conduit 208, as well as the other components of sensor 200. In the example shown, housing 202 may include gas inlet 222 and gas outlet 224, which may be configured to be in fluid communication with a volume of gas. Pump 212 may be configured to move a gas through gas conduit 208. In some examples, pump 212 may be configured to stop a flow of gas during detection of a particle captured by filter 204, e.g., by sensor 206. In some examples, detection of a particle captured by filter 204 may occur while the gas is flowing within gas conduit 208. In the example shown, housing 202 is configured to provide a flow path for a gas, e.g., via gas inlet 222, gas conduit 208, and gas outlet 224. Valve 210 may be configured to close, or shut off, fluid communication between gas inlet 222 and conduit 208. In some examples, valve 210 may be located anywhere along the flow path defined by conduit 208, e.g., before or after pump 212, and before or after filter 204. In some examples, valve 208 may define gas inlet 222 or gas outlet 224, and in some examples housing 202 may include more than one valve 210, e.g., an inlet valve and an outlet valve which may define gas inlet 222 and gas outlet 224, respectively.

Housing 202 may be configured to house and protect the components of particle sensor 200. For example, particle sensor 200 may operate on a vehicle, such as a motor vehicle, and aircraft, a watercraft, and the like, or may be included in a handheld device. Housing 202 may be configured to maintain a measurement geometry, such as the alignment of sensor 206 and filter 204, during particle detection under adverse environmental conditions, such vehicle operating conditions, e.g., takeoff, landing, and during flight, for an aircraft, as well as handling conditions such as accidental dropping of a handheld device including particle sensor 200. Adverse environmental conditions may include flight environmental conditions. For example, adverse environmental conditions may include any of a vibration, such as associated with takeoff, landing, and during flight for an aircraft, or vibrations associated with a motor vehicle or watercraft.

Filter 204 may be a CNT filter comprising a metal substrate defining a plurality of apertures and/or pores and a plurality of CNTs on the metal substrate configured to capture particles, such as a virus. For example, filter 204 may include a metal substrate including a metal alloy of, for example, nickel and aluminum. A plurality of CNTs may be grown on the surface of a first phase of the metal substrate and configured to capture particles, e.g., based on particle size, contained in the gas passing through the metal substrate apertures. As used herein to refer to the metal alloy phases, "first" and "second" are used the nominal sense for ease of reference to two different phases, and do not refer to primary and secondary phases of the metal alloy. In some examples, filter 204 may be substantially similar to one or both of filters 400 and 800 illustrated and described below with respect to FIGS. 4-11D.

Sensor 206 may be configured to detect the presence and/or amount of a particle captured by filter 204. In some examples, sensor 206 may be a Raman spectrometer configured to illuminate filter 204 and determine the presence and/or amount of a particle based on a signature of the particle included in a received optical signal. In some examples, any suitable sensor or sensing method may be used to determine the presence and/or amount of a particle captured by filter 204.

Controller 214 may be an electronic controller including processing circuitry. For example, controller 214 may include a processor and/or other processing circuitry and computer-readable storage medium encoded with instructions for causing valve 210 to open and close, for causing pump 212 to move a gas through conduit 208, for causing sensor 206 to execute a measurement to detect a particle captured by filter 204, for causing a metal substrate of filter 204 to be heated so as to destroy a particle captured by filter 204, and/or for communication with an external device via interface 216. In some examples, controller 214 may be connected to interface 216. Interface 216 may be configured to enable communication between controller 214 and external devices, e.g., via any suitable wired or wireless communication. Particle sensor 200 may include connector 218. Connector 218 may be configured to be a communications connector, e.g., a wired communications connection, and/or a connector for receiving power. Particle sensor 200 may receive electrical power via any suitable wired or wireless technology.

In some examples, particle sensor 200 may be a handheld device. For example, a user, such as an aircraft passenger, may breathe into particle sensor 200 through inlet 222. Controller 214 may be configured to open valve 210 upon a person breathing into inlet 222. In other examples, the user and/or an operator may push a button or otherwise mechanically cause valve 210 to open upon breathing into inlet 222. Pump 212 may move the user's breath through conduit 208, or pump 212 may be omitted and the user's exhalation may move the user's breath through conduit 208, filter 204, and out outlet 224. If a particle is detected, such as described below, the user and/or an operator would be alerted.

Controller 214 may be configured to determine the presence and/or amount of a particle captured by filter 204 based one or more measurements performed by sensor 206. In some examples, an external device may determine the presence and/or amount of a particle captured by filter 204 based one or more measurements performed by sensor 206, e.g., via a signal corresponding to the one or more measurements sent to the external device via interface 216.

Figure 3:
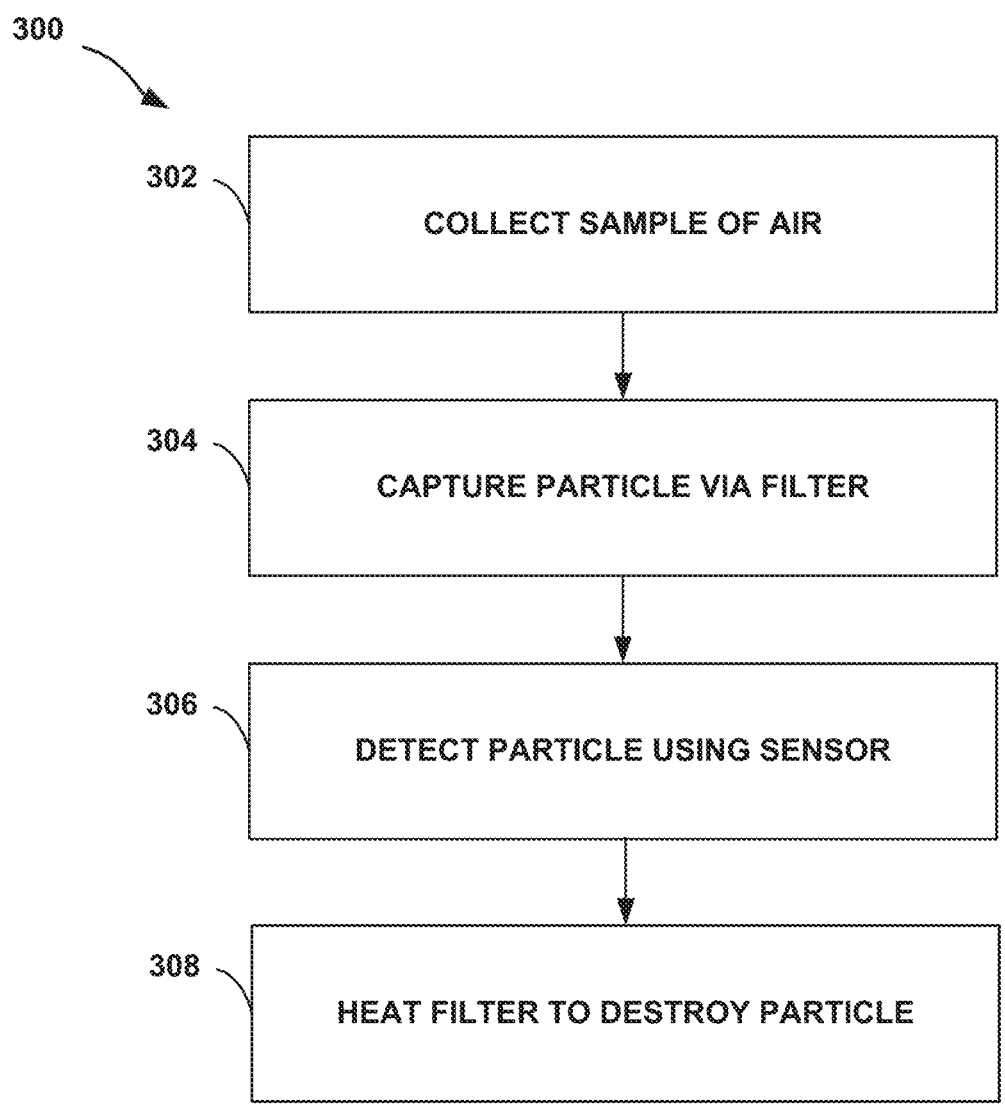
FIG. 3 is a flowchart of an example method of detecting a particle using an example CNT filter in accordance with examples of the present disclosure.

FIG. 3 is a flowchart of an example method of detecting a particle, in accordance with techniques of the present disclosure. While method 300 is described with reference to particle sensor 200, in other examples, the method 300 may be used with other sensors.

Controller 214 may cause valve 210 to open and pump 212 to cause a gas, such as air, go move through conduit 208, drawing the gas in through inlet 222 and out through outlet 224, thereby collecting a sample of a portion of a gas in fluid communication with gas inlet 222 by moving the gas through filter 204 (302).

Filter 204 may capture a particle, such as a pathogen, from the gas flowing through conduit 208 (304). For example, filter 204 may include a metal substrate, such as a 2D metal mesh or 3D metallic open cell foam, configured to allow the gas to pass through apertures of the mesh or foam without a substantial pressure drop across filter 204. Filter 204 may include a plurality of CNTs grown on the surface of the metal substrate and configured to capture particles, e.g., based on size.

Controller 214 may cause sensor 206 to detect a particle captured by filter 204 (306). For example, sensor 206 may be a Raman spectrometer configured to illuminate filter 204 and determine the presence and/or amount of a particle based on a signature of the particle included in a received optical signal. For example, sensor 206 may illuminate filter 204 with substantially monochromatic laser light. The light may interact with one or more particles of one or more particle types captured by filter 204. For example, the laser light may interact with molecular vibrations, phonons, or other excitations of the one or more particles resulting in inelastic scattering (e.g., Raman scattering) of the laser light and a shift in the energy (e.g., and frequency) of the inelastically scattered laser light. The shift in energy gives information about the vibrational modes of the one or more captured particles and may provide a "structural fingerprint" of the captured particles such that different types of particles may be identified and distinguished based on the detected Raman scattering. For example, the amount scattered light as a function of wavelength may be detected, e.g., a spectrum of the scattered light may be detected via a spectrometer. The spectra of particles of different type may result in different spectral signatures in spectra captured by the detector(s) of the Raman spectrometer. The spectra may have peaks and/or valleys (e.g., high or low amounts of light at specific wavelengths and/or wavelength bands) based on particle type. In some examples, particles may be distinguished by differences in their spectra including peaks and valleys at different wavelengths, peaks and valleys having different widths at half-height (e.g., full-width at half-height FWHM or half-width at half-height HWHM), different amounts of light and/or energy levels at the same wavelength and/or wavelengths, and the like. In some examples, a virus may be distinguished from other pathogens, particles, or other viruses based on spectral differences arising from Raman shifts due to different proteins of the virus.

In some examples, controller 214 may cause sensor 206 to detect a particle at a particular point, location, region, area, position, etc., of filter 204. In some examples, controller 214 may cause sensor 206 to detect a particle at a plurality of points, locations, regions, areas, positions, etc., of filter 204, e.g., so as to spatially "scan" filter 204 to detect a particle. In some examples, controller 214 may cause sensor 206 to detect a particle at one or more locations on filter 204 at a plurality of times. For example, controller 214 may cause sensor 206 to detect a particle at one or more locations on filter 204 at 100 times per second, e.g., 100 hertz (Hz), 10 Hz, 1 Hz, once per minute, once per ten minutes, once per hour, once per day, or at any other detection rate.

In some examples, controller 214 and/or an external device may determine the presence and/or amount of a particle captured by filter 204 based one or more measurements performed by sensor 206, e.g., one or more spectra of one or more particles detected by sensor 206. In some examples, controller 214 and/or an external device may determine an amount of a particle qualitatively. For example, controller 214 may determine whether an amount of a particle captured by filter 204 at a first time is more and/or less than the amount of the particle captured by filter 204 at a second time based on one or more spectra detected at the first time and one or more spectra detected at the second time.

In some examples, controller 214 and/or an external device may compare peaks and/or valleys of detected spectra to a threshold and may determine and record the spectra as positive or negative regarding the presence of a particle. In some examples, controller 214 and/or an external device may use such thresholding to determine whether individual points, locations, regions, areas, positions, etc., of a scan of filter 204 include a particle. In other words, based on detected spectra, controller 214 and/or an external device may determine a spatial image of the presence and/or amount of a particle captured by filter 204. In some examples, controller 214 and/or an external device may determine particle loads, particle flux, filtration rate of the particle, and the like, based on a spatial image of the presence and/or amount of a particle captured by filtered 204 based on the detected spectra.

In some examples, any suitable sensor or sensing method may be used to determine the presence and/or amount of a particle captured by filter 204 and controller 214 and/or an external device may determine the presence and/or amount of a particle captured by filter 204 by any suitable method.

In some examples, a particle may include dust, hair, allergens, pathogens, and the like. For example, a particle that may be captured by filter 204 and detected by sensor 206 may include a pathogen, such as a bacterium, a virus, or any microorganism that can cause disease. In some examples, a particle may include a pathogen such as severe acute respiratory syndrome coronavirus 2 (SARS-CoV-2), e.g., the coronavirus causing Coronavirus Disease 2019 (COVID-19), or any other coronavirus.

After sensor 206 has detected the presence and/or amount of a particle, controller 214 may cause a metal substrate of filter 204 to heat so as to destroy a particle, e.g., a pathogen, captured by filter 204 (308). For example, filter 204 may be connected to a power source, and controller 214 may cause the power source to apply voltage and/or a current to the metal substrate of filter 204 to cause resistive or Joule heating of the metal substrate to destroy captured particles. Because the CNTs of filter 204 may be grown on catalyst sites that are part of the metal alloy, as opposed to a catalyst deposited on the surface of the substrate, the CNTs and catalyst may be heated without causing the CNTs to detach, e.g., the CNTs may remain attached during heating so as to destroy a captured particle. In some examples, the metal substrate and/or CNTs may be heated to at least about 60 degrees Celsius (° C.), or at least about 150° C., or about 200° C., or at least about 250° C. In some examples, the metal substrate and/or CNTs may be heated to temperature and for an amount of time so as to destroy the particle without starting oxidation of the carbon of the CNTs. In other words, the metal substrate may be heated to a high enough temperature and for a time sufficient to destroy a particle, but low enough and for a time sufficient to avoid and/or reduce oxidation of the CNTs. In some examples, heating the metal substrate so as to destroy the particle may "clean" filter 204, e.g., enable a subsequent detection of the presence and or amount of a particle. For example, controller 214 may cause pump 212 to remove a gas from conduit 208 and may cause valve 210 to close so that a gas does not flow through filter 204. The metal substrate of filter 204 may be heated to as to destroy the particle, or particles, captured by the virus. Controller 214 may than cause method 300 to repeat to obtain a second detection of a particle.

In some examples, destroying the particle via heating the metal substrate may deactivate, kill, denature or degrade the particle. In general, heating the metal substrate to a higher temperature may deactivate, kill, denature or degrade the particle in a shorter period of time. For example, biological macromolecules may denature at temperature ranges from 50° C. to 100° C., which may be reversible and may take a long time to "kill" pathogens. Biological macromolecules may start to degrade at 150° C. to 200° C., e.g., biological macromolecules may fully change chemistry into simpler and/or more stable organics in a very short time. The products of the degraded macromolecules may be gaseous like methane, hydrogen, or simpler stable solids like sugars which may remain on filter 204. In some examples, the Raman peaks associated with a biological pathogen may disappear from the detected spectra if the metal substrate is heated so as to denature and/or degrade the biological pathogen.

In some examples, heating the metal substrate so as to destroy the particle may "clean" the volume of gas, e.g., reduce and/or remove an amount of the particle for a volume of gas. For example, controller 214 may cause the metal substrate to be heated so as to destroy the particle captured by filter 204, e.g., a pathogen, while cause pump 212 to cause a gas from a volume of gas to flow through conduit 208. In some examples, the heating and gas flow may be continuous, and the gas may be circulated through conduit 208. In some examples, sensor 206 may continually detect the presence and/or amount of a particle captured by filter 204, where filter 204 may be at any temperature. In other words, filter 204 may capture and destroy particles while sensor 206 continually detects, e.g., monitors, the presence and/or amount of the particle captured by filter 204. In some examples, sensor 206 may detect the presence and/or amount of a particle captured by filter 204 over a period of time, and sensor 206, or controller 214, or an external device may determine the amount of the particle in a volume of gas based on the presence and/or amount of the particle detected over the period of time.

Figure 4:
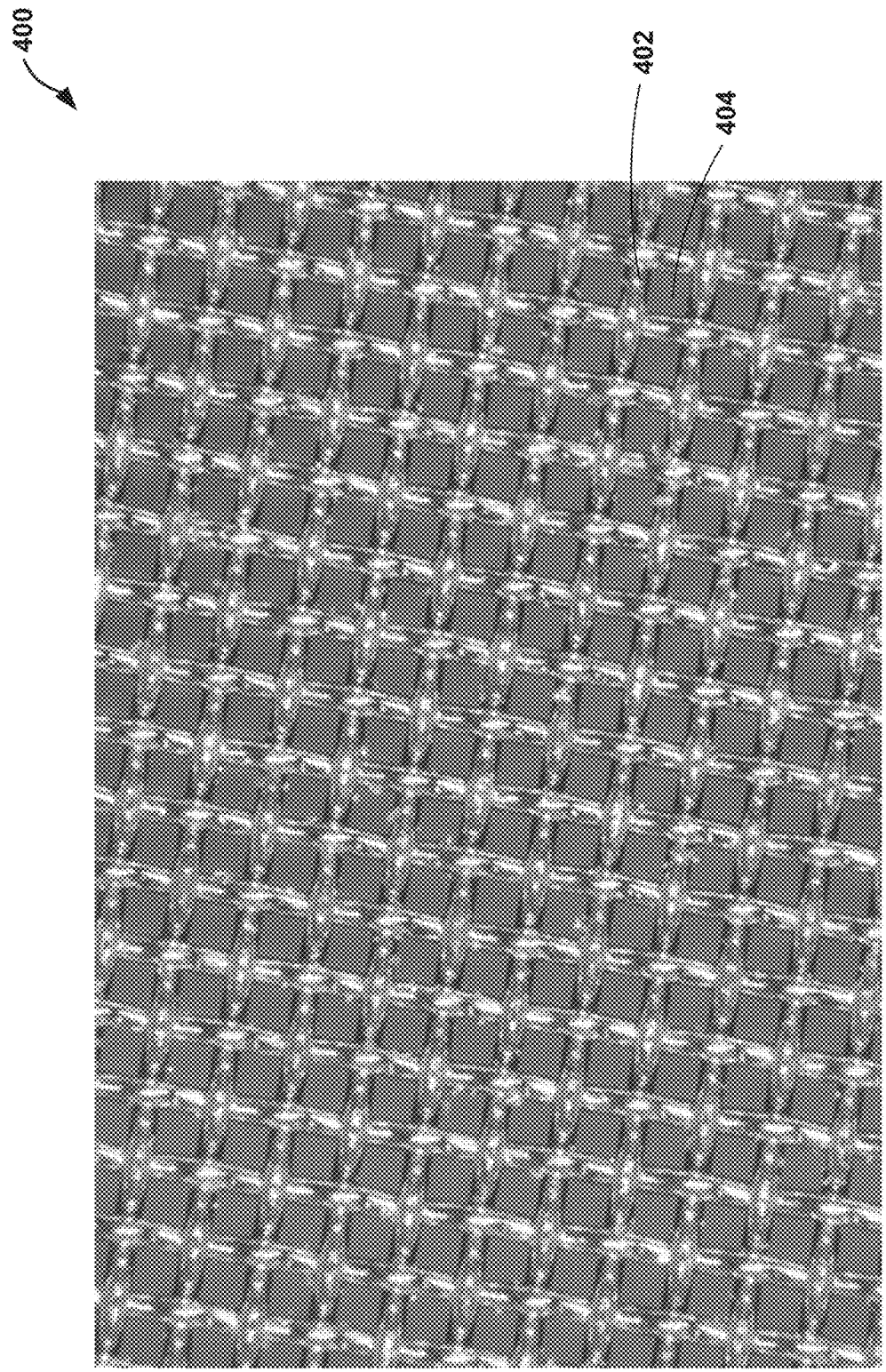
FIG. 4 is a perspective view of a portion of an example CNT filter in accordance with examples of the present disclosure.
Figure 5:
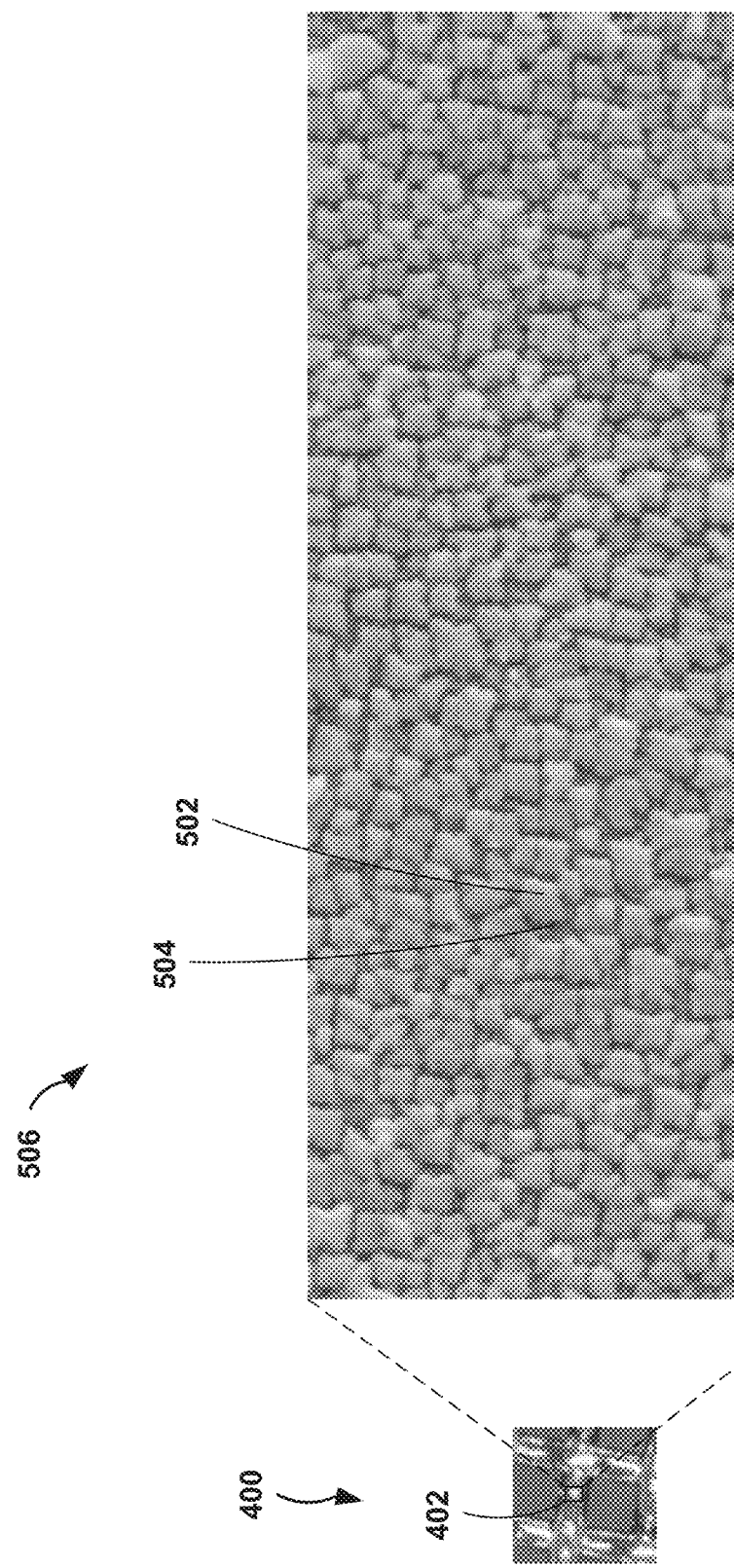
FIG. 5 is a magnified perspective view of a portion of an example CNT filter substrate prior to growth of CNTs in accordance with examples of the present disclosure.
Figure 6:
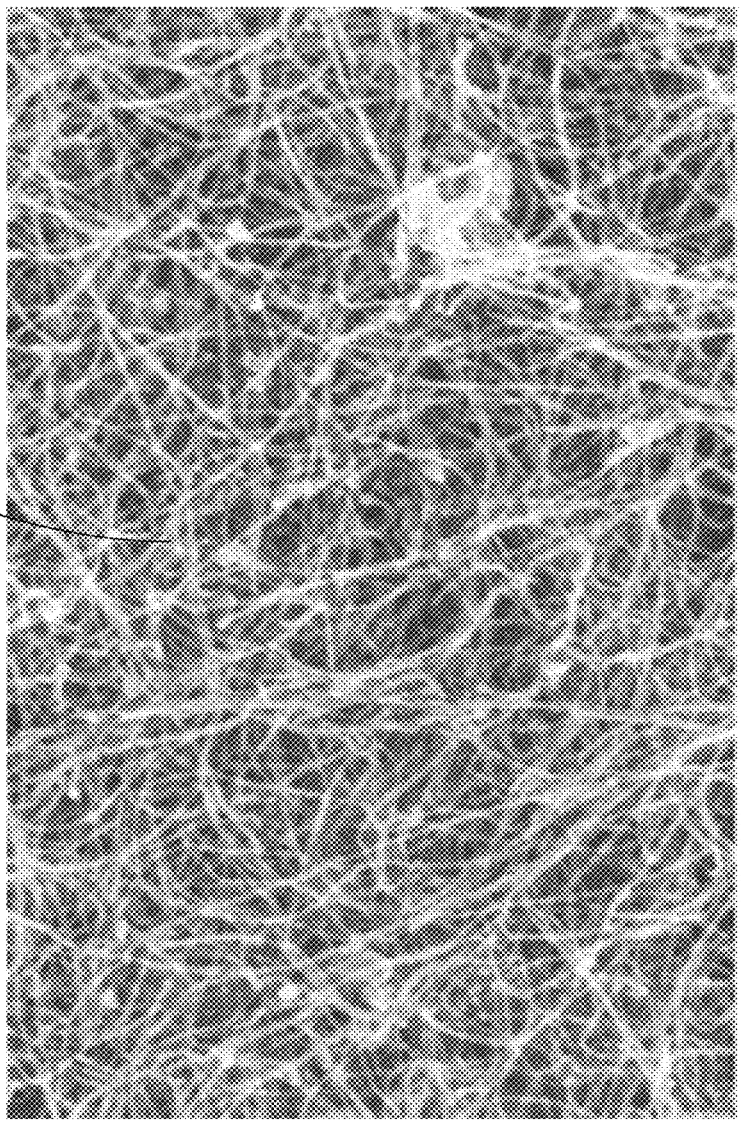
FIG. 6 is a magnified perspective view a portion of an example CNT filter illustrating a plurality of CNTs grown on the CNT filter substrate, in accordance with examples of the present disclosure.

FIGS. 4-6 illustrate different views of an example CNT filter 400 at different magnifications and at different steps in a process of making CNT filter 400. CNT filter 400 is described with reference to FIGS. 4-6 concurrently below.

FIG. 4 is a perspective view of a portion of an example CNT filter 400 in accordance with examples of the present disclosure. CNT filter 400 includes a metal substrate 402 including a plurality of apertures 404 (only a single aperture is labeled in FIG. 4).

In some examples, metal substrate 402 may be formed of an alloy including at least a first and a second metal. For example, metal substrate 402 may be formed of metal alloy including a nickel-based alloy or superalloy, such as a nickel-aluminum (NiAl) alloy. Suitable alloys may include but are not limited to Alloy 10, Inconel 718, Inconel 713LC, MAR 247, MAR 246, MAR 200, PWA 1480, PWA 1484, Rene N4, B1900, Inconel 625, cobalt-aluminum alloys, cobalt-iron alloys, any superalloy for which a nickel, aluminum, or titanium gamma prime phase may be precipitated by a heat treatment, or any other suitable metal alloy. In some examples, a suitable alloy may be a nickel or cobalt based alloy including at least 3% aluminum.

As will be described below, the alloy of metal substrate 402 may be selected such that a first phase precipitates out from a second phase of the alloy in a spatial pattern. Metal substrate 402 may further be selected such that the first phase may be etched, e.g., via chemical etching, to remove an alloying element and/or metal and leave "islands" of a different alloying element and/or metal in the spatial pattern that may function as growth sites for CNTs.

Figure 8:
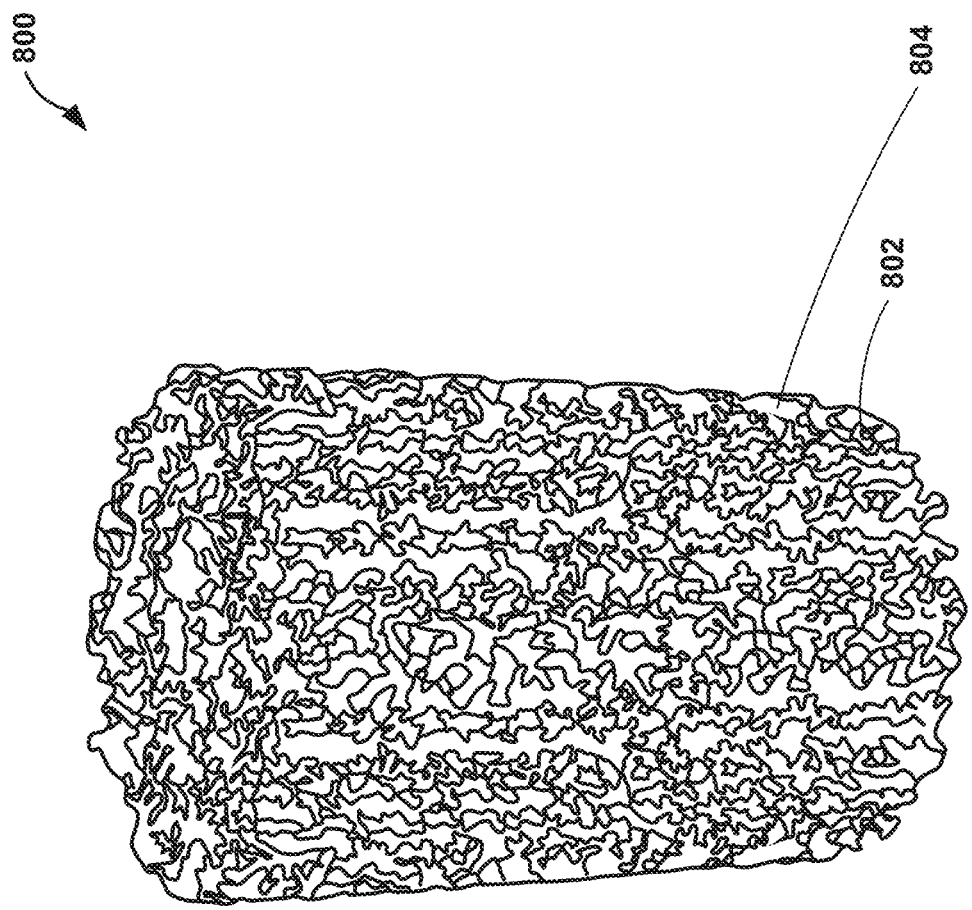
FIG. 8 is a perspective view of an example 3D metallic open cell foam CNT filter, in accordance with examples of the present disclosure.
Figure 10C:
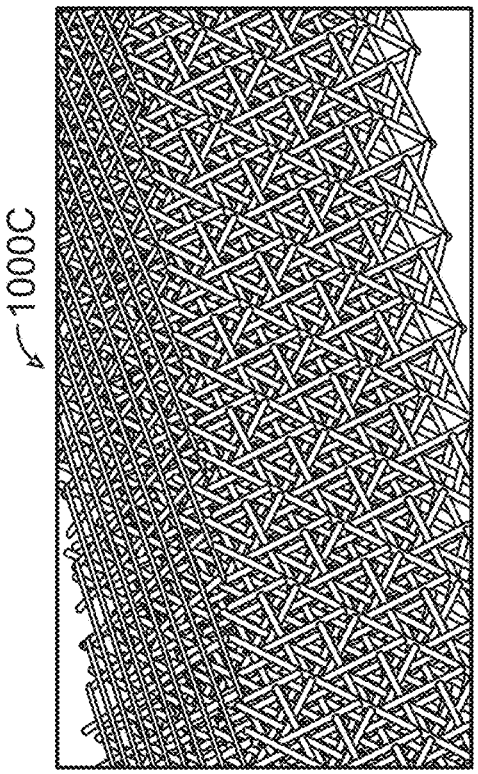
FIGS. 10A-10F are perspective views of example three-dimensional (3D) metallic open cell foam CNT filters, in accordance with examples of the present disclosure.
Figure 10B:
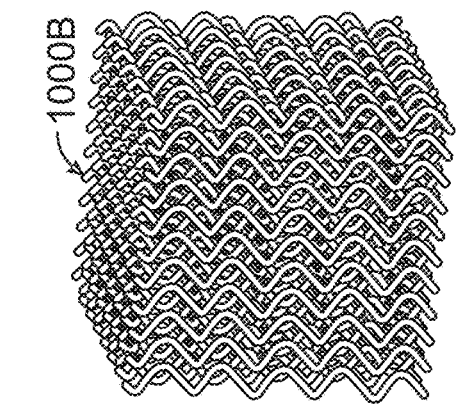
Figure 10A:
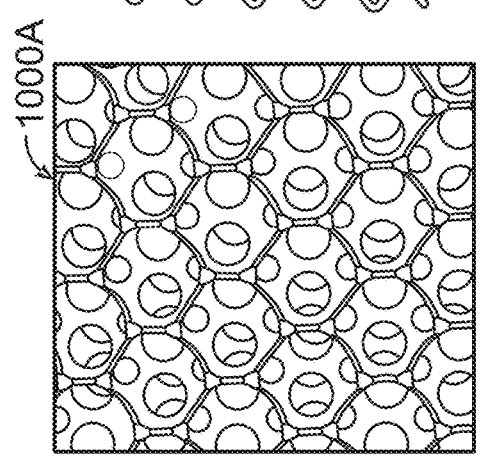
Figure 10F:
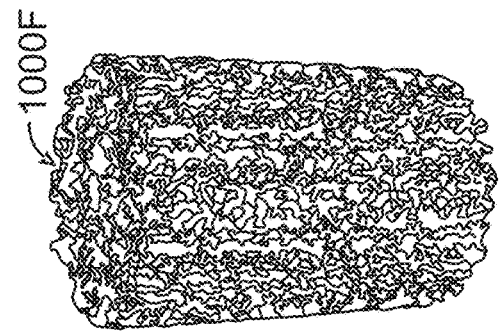
Figure 10E:
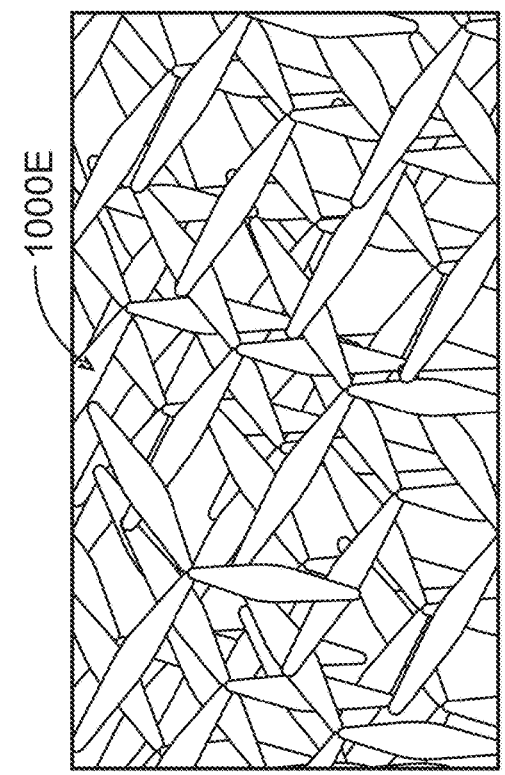
Figure 10D:
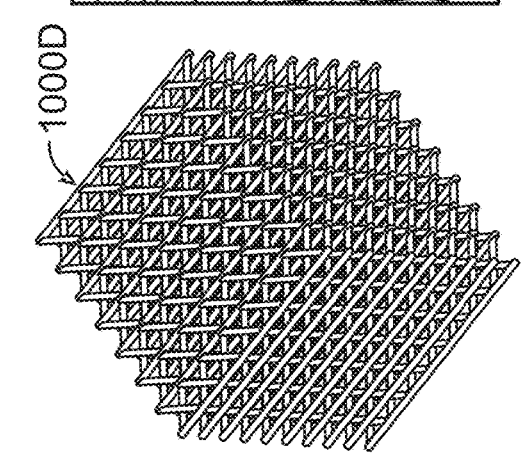

In the example shown, metal substrate 402 may be referred to as a 2D metal mesh that allows air to pass through apertures 404. In some examples, metal substrate 402 may be a 3D metallic open cell foam, such as illustrated in FIG. 8. In some examples, CNT filter 400 may be substantially similar to CNT filter 204, and apertures 404 may be sized such that CNT filter 400 does not cause a substantial pressure drop of a flow of a gas, e.g., air, through apertures 404. For example, metal substrate 402 may have a density of at least 5, a density of at least 9, a density of at least 20, a density of at least 30, a density of at least 40, or any other density. In some examples, the "strands," "fibers," "struts," etc., may have an effective diameter of at least 0.5 mm, an effective diameter of at least 0.75 mm, an effective diameter of at least 1.0 mm, and effective diameter of at least 2.0 mm, an effective diameter of at least 3.0 mm, or any other effective diameter. In some examples, apertures 404 may have an effective diameter of at least 0.1 mm, an effective diameter of at least 0.3 mm, an effective diameter of at least 0.6 mm, an effective diameter of at least 0.8 mm, an effective diameter of at least 1.0 mm, an effective diameter of at least 2.0 mm, an effective diameter of at least 3.0 mm, or any other effective diameter.

In some examples, metal substrate 402 formed as a 2D metal mesh may be formed by laser cutting, stamping, or any other suitable method. In some examples, metal substrate 402 formed as a 3D metallic open cell foam may be formed by reticulated foam coating, lost polymer casting, adding foaming agents to a metallic powder slurry and firing, or by any other suitable method.

FIG. 5 is a magnified perspective view of a portion of the surface of example CNT filter 400 metal substrate 402 prior to growth of CNTs in accordance with examples of the present disclosure. FIG. 5 includes a plurality of first phase regions 502 of the metal alloy of metal substrate 402 precipitated out of the metal alloy, e.g., by heating of the metal alloy. As shown, first phase regions 502 form discrete "islands" on the surface of the metal alloy substrate 402 that are surrounded by second phase 504, e.g., in a spatial pattern 506. For example, metal substrate 402 may be a nickel-aluminum alloy (e.g., Ni—Al superalloy). The composition of the alloy may be selected such that when the alloy substrate is heated, a gamma prime phase may precipitate out of the alloy. As used herein to refer to the metal alloy phases, "first" and "second" are used the nominal sense for ease of reference to two different phases and do not refer to primary and secondary phases of the metal alloy.

As will be described below, in some examples, metal substrate 402 may be etched after heating. For example, metal substrate 402 may be chemically etched to remove aluminum from the first phase regions 502, e.g., regions of gamma prime phase, of the spatial pattern 506, leaving a highly active nickel surface in spatial pattern 506 to catalyze growth of CNTs.

In some examples, spatial pattern 506 determines characteristics of CNT growth. For example, the size, shape, and spacing of spatial pattern 506 may determine the size, shape, length, and distribution of CNTs grown on spatial pattern 506. In some examples, spatial pattern may include a distribution of sizes, shapes, and spacings. For example, spatial pattern 506 may include the plurality of first phase regions 502 that are substantially rectangular, and spacings between first phase regions 502 may be from about 10 nm to about 500 nm. In some examples, the spacings between first phase regions 502 may determine the spacing, or interspacing, between CNTs, e.g., at early stages of CNT growth while the growth is columnar.

First phase regions 502 may include a distribution of sizes for example, one or both of the lengths of first phase regions 502 may be from about 10 nm to about 2 μm. In some examples, the planar distribution of first phase regions 502 may include at least 50% of the surface area of metal substrate 402, the planar distribution of first phase regions 502 may include at least 75% of the surface area of metal substrate 402, the planar distribution of first phase regions 502 may include at least 95% of the surface area of metal substrate 402, or any other surface area of metal substrate 402. In some examples, CNT filter 400 may include other sizes and size ranges of first phase regions 502, and other spacings and other ranges of spacings between first phase regions 502.

First phase regions 502 may include nickel or cobalt. For example, first phase region 502 may be a nickel aluminide, e.g., $Ni_3Al$. In some examples, first phase regions 502 may include at least 70 weight-percent (wt %) nickel, at least 86 wt % nickel, at least 90 wt % nickel, or any other wt % nickel.

In some examples, second phase 504 may be a solid solution of nickel and other elements in the alloy. For example, second phase 504 may be a nickel-aluminum or cobalt-aluminum composition different from first phase regions 502.

FIG. 6 is a magnified perspective view a portion of an example CNT filter 400 illustrating a plurality of CNTs 602 grown on the CNT filter 400 metal substrate 402, in accordance with examples of the present disclosure. In some examples, the size, density, and spatial distribution of CNTs corresponds to the distribution of shapes, sizes, and spacings of spatial pattern 506 of first phase regions 502. In some examples, CNTs 602 include a plurality of CNT apertures, e.g., spacings between neighboring CNTs. In some examples, the CNT apertures may be sized so as to capture certain particles, such as pathogens. For example, the CNT apertures may be from about 5 nm to about 500 nm and may be configured to capture a virus.

CNTs 602 may be grown on first phase regions 502, e.g., via a catalyst of first phase regions 502. CNTs 602 may be single wall or double wall CNTs. In some examples, CNTs 602 may have a diameter of at least 10 nm, a diameter of at least 25 nm, a diameter of at least 50 nm, or any other diameter. CNTs 602 may have a length of at least 10 μm, a length of at least 100 μm, a length of at least 1 mm, a length of at least 3 mm, or any other length.

Figure 7:
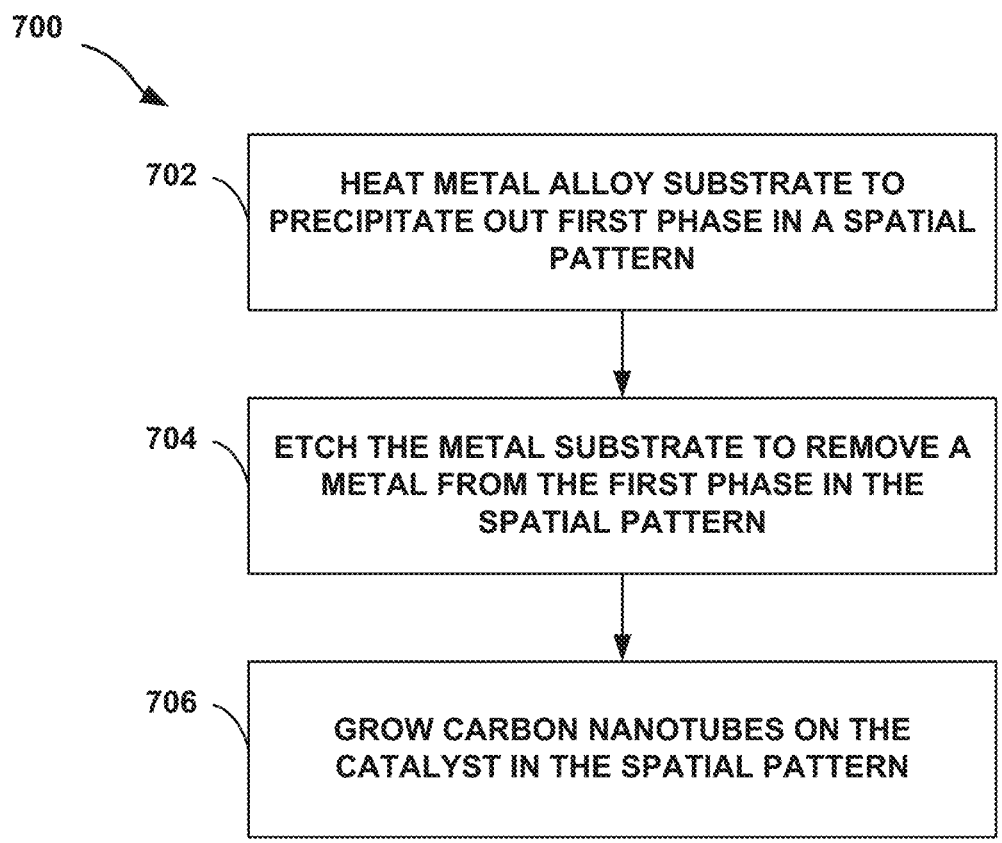
FIG. 7 is a flowchart of an example method of making an example CNT filter, in accordance with examples of the present disclosure.

FIG. 7 is a flowchart of an example method 700 of making an example CNT filter, in accordance with examples of the present disclosure. Method 700 may be used, for example, to make any of filter 204 and/or CNT filter 400.

A metal substrate of a CNT filter including a metal alloy may be heated so as to precipitate out a first phase from a second phase of the metal alloy in a spatial pattern (702). For example, metal substrate 402 may be heated so as to precipitate first phase regions 502 in spatial pattern 506 surrounded by second phase region 504. In some examples, first phase regions are a gamma prime phase and include only nickel and aluminum or cobalt and aluminum.

After heating, the metal substrate may be etched to remove a metal from the precipitated first phase (704). For example, metal substrate 402 may include a nickel-aluminum or a cobalt-aluminum superalloy heated to precipitate out a gamma prime phase of the alloy in spatial pattern 506. The aluminum may be removed via chemical etching, leaving the catalytic metal nickel (or cobalt) on the surface of first phase regions 502 in spatial pattern 506. In some examples, the etching may be performed at room temperature.

In some examples, first phase regions 502 may be the gamma prime phase of the alloy in spatial pattern 506 and may consist essentially of at least 70 wt % nickel or cobalt, at least 86 wt % nickel or cobalt, or at least 90 wt % nickel or cobalt. In some examples, etching removes aluminum from first phase regions 502 and after etching, first phase regions 502 may consist essentially of at least 95 wt % nickel or cobalt or at least 99 wt % nickel or cobalt. In some examples, the catalytic metal on the surface of the first phase regions 502 is part of the structure of metal substrate 402.

In other words, and by way of analogy, the resulting catalytic metal, e.g., nickel, cobalt, or any suitable CNT catalyst, is like a primer that is a part of the surface being primed to promote adhesion of a coating or material to be adhered to the surface, as opposed to a primer coated on a surface. In the case of a coated primer, there are two bonds which may fail, the bond between the surface and the primer, and the bond between the primer and the material intended to be adhered to the surface via the primer. Similarly, a CNT filter including a catalyst that is coated and/or deposited on a substrate has two bonds which may fail, the bond between the substrate and the catalyst and the bond between the catalyst and the CNTs grown on the catalyst. By way of contrast, a catalyst included in a phase of an alloy precipitated out from a second phase of the alloy as described herein is part of the structure of the metal substrate. As such, one of the potential bond failures is eliminated, and there is only one bond which may fail, the bond between the CNTs and the catalyst, which may typically be very high strength bonds.

After etching, CNTs may be grown on the catalyst in the spatial pattern (706). For example, the highly active nickel, cobalt, or other suitable catalytic metal in spatial pattern 506 may catalyze growth of CNTs during CVD coating in a hydrocarbon vacuum atmosphere at elevated temperature. In some examples, nickel and cobalt may be corrosion resistant and may promote a superior bond to the CNTs as compared with iron.

FIG. 8 is a perspective view of an example 3D metallic open cell foam CNT filter 800, in accordance with examples of the present disclosure. CNT filter 800 includes a metal substrate 802 including a plurality of apertures 804, e.g., alternatively referred to as voids 804 given the 3D structure of metal substrate 802 (only a single aperture/void is labeled in FIG. 8).

In some examples, the material and composition of metal substrate 802 may be substantially similar to metal substrate 402 described above. For example, metal substrate 802 may be formed of an alloy including at least a first and a second metal, such as a nickel-based alloy, a superalloy such as, Alloy 10, a nickel or cobalt based alloy, nickel-aluminum alloy, a cobalt-aluminum alloy, or any other suitable metal alloy.

Similar to metal substrate 402, the alloy of metal substrate 802 may be selected such that a first phase precipitates out from a second phase of the alloy in a spatial pattern. Metal substrate 802 may further be selected such that the first phase may be etched, e.g., via chemical etching, to remove an alloying element and/or metal and leave "islands" of a different alloying element and/or metal in the spatial pattern that may function as growth sites for CNTs as described above.

In the example shown, metal substrate 802 may be referred to as a 3D metallic opens cell foam that allows air to pass through apertures 804. In some examples, CNT filter 800 may be substantially similar to CNT filter 204, and apertures 804 may be sized such that CNT filter 800 does not cause a substantial pressure drop of a flow of a gas, e.g., air, through apertures 804.

In the example shown, a gas passing through CNT filter 804 may pass through a plurality of apertures 804 and may come into fluid communication with a plurality of the "strands," "fibers," "struts," etc., of metal substrate 802 defining apertures 804. By way of contrast, a gas passing through 2D metal mesh CNT filter 400 may pass through a single aperture (assuming no backflow or swirling) and come into fluid communication with a single strand, fiber, strut, etc., of metal substrate 402. In some examples, 3D metallic open cell foam CNT filter 800 may capture more particles for a given cross-sectional area flow path of a gas as compared with 2D metal mesh filter 400. In some examples, sensor 206 may be able to detect particles captured within the volume of 3D metallic open cell foam CNT filter 800, e.g., for example, illumination light of a Raman spectrometer may propagate throughout the volume of 3D metallic open cell foam CNT filter 800 via multiple reflections from the surfaces of metal substrate 802, and Raman scattered light may propagate from the volume of 3D metallic open cell foam CNT filter 800 to the detector(s) of sensor 206 via multiple reflections from the surfaces of metal substrate 802.

In some examples, a ratio of the volume of metal substrate 802 to the volume of apertures 804 of the total volume of CNT filter 800 may be less than about 30%. In some examples, the metal substrate 802/apertures 804 volume ratio may be less than about 10%, less than about 5%, or less than about 1%. In some examples, metal substrate 802 may be formed via foundry, powder metallurgy, casting processes, advanced manufacturing, or by any other suitable method. For example, metal substrate 802 may be cast with an open cell polyurethane foam skeleton.

FIGS. 9A-9H, 10A-10F, and 11A-11D are a perspective views of example CNT filters, in accordance with examples of the present disclosure.

FIGS. 9A-9H are perspective views of example 2D metal mesh CNT filters 900A-900H, in accordance with examples of the present disclosure. In some examples, 2D metal mesh CNT filters 900A-900H may be substantially similar to 2D metal mesh CNT filter 400 described above only having different mesh geometries, as illustrated.

FIGS. 10A-10F are perspective views of example 3D metallic open cell foam CNT filters 1000A-1000F, in accordance with examples of the present disclosure. In some examples, 3D metallic open cell foam CNT filters 1000A-1000F may be substantially similar to 3D metallic open cell foam CNT filter 800 described above only having different open cell foam geometries, as illustrated.

FIGS. 11A-11D are perspective views of example 2D metallic open cell foam CNT filters 1100A-1100D, in accordance with examples of the present disclosure. In some examples, 2D metallic open cell foam CNT filters 1100A-1100D may be substantially similar to any of 2D metal mesh CNT filters 400 and 900A-900H or 3D metallic open cell foam CNT filters 800 and 1000A-1000F described above only having different open cell foam geometries, as illustrated. For example, any of 2D metallic open cell foam CNT filters 1100A-1100D may be a 2D metal mesh that is extended in a direction perpendicular to 2D area of the mesh, e.g., a "thick" 2D mesh. In some examples, the apertures of 2D metallic open cell foam CNT filters 1100A-1100D may be considered to be "tubes" that extend in the perpendicular direction and have the same cross-sectional shape along the perpendicular direction.

Various examples have been described. These and other examples are within the scope of the following claims.

What is claimed is:

1. A method of making a filter, the method comprising:
   heating a metal substrate comprising a metal alloy to precipitate a first phase out from a second phase on a surface of the metal substrate, wherein the metal substrate defines a plurality of apertures configured to allow a gas to pass through the apertures, wherein the metal substrate comprises the metal alloy, wherein the metal alloy comprises a first metal and a second metal, wherein the first phase comprises a gamma prime phase of nickel or cobalt, wherein the gamma prime phase of the nickel or the cobalt is part of a structure of the metal substrate; and
   growing a plurality of carbon nanotubes (CNTs) on the surface of the first metal of the first phase, wherein the CNTs are configured to capture at least one particle.

2. The method of claim 1, further comprising etching, following the heating, the metal substrate to remove the second metal from the first phase.

3. The method of claim 2, wherein the first metal comprises one of nickel and cobalt.

4. The method of claim 2, wherein the metal substrate comprises one of a two-dimensional (2D) metallic mesh, a 2D metallic open cell foam, and a three-dimensional (3D) metallic open cell foam.

5. The method of claim 1, wherein the metal substrate is configured to allow the gas to pass through the apertures substantially without a pressure difference from one side of the filter relative to the other side of the filter.

6. The method of claim 2, wherein the metal alloy comprises a nickel aluminum alloy and the first metal is nickel and the second metal is aluminum,
   wherein the first phase is a gamma prime phase of the nickel aluminum alloy,
   wherein etching the metal substrate comprises chemically etching the metal substrate to remove the aluminum from the gamma prime phase leaving nickel as an active site for the CNT
   wherein growing the plurality of CNTs comprises growing the plurality of CNTs via chemical vapor deposition.

7. The method of claim 6, wherein the CNTs define a plurality of apertures within a range from 5 nm to 500 nm.

8. The method of claim 1, wherein heating the metal substrate precipitates the first phase in a predetermined spatial pattern, the predetermined spatial pattern comprising a plurality of regions of the first phase, wherein a spacing between each of the plurality of regions comprising the first phase is between from about 10 nm to about 500 nm and is less than a spacing between adjacent apertures of the plurality of apertures, wherein the first phase is configured to catalyze growth of the plurality of CNTs.

9. The method of claim 8, wherein the predetermined spatial pattern comprises a plurality of substantially rectangular regions comprising the first phase, wherein the plurality of substantially rectangular regions comprising the first phase are distributed on the surface of the metal substrate substantially uniformly.

10. The method of claim 9, wherein a spacing between each of the plurality of substantially rectangular regions comprising the first phase is between from about 10 nm to about 500 nm.

11. A filter comprising:
    a metal substrate defining a plurality of apertures configured to allow a gas to pass through the apertures, the metal substrate comprising a metal alloy, the metal alloy comprising a first metal and a second metal; and
    a plurality of carbon nanotubes (CNTs) grown on a surface of a first phase precipitated out from a second phase of the metal alloy, the plurality of carbon nanotubes configured to capture at least one particle contained in the gas passing through the metal substrate,
    wherein the first phase comprises a gamma prime phase of nickel or cobalt, wherein the gamma prime phase of the nickel or the cobalt is part of a structure of the metal substrate.

12. The filter of claim 11, wherein the first phase is precipitated from the metal alloy in a predetermined spatial pattern, the predetermined spatial pattern comprising a plurality of regions of the first phase, wherein a spacing between each of the plurality of regions comprising the first phase is between from about 10 nm to about 500 nm and is less than a spacing between adjacent apertures of the plurality of apertures, wherein the first phase is configured to catalyze growth of the plurality of CNTs.

13. The filter of claim 12, wherein the predetermined spatial pattern comprises a plurality of substantially rectangular regions comprising the first phase, wherein the plurality of substantially rectangular regions comprising the first phase are distributed on a surface of the metal substrate substantially uniformly, wherein a spacing between each of the plurality of substantially rectangular regions comprising the first phase is between from about 10 nm to about 500 nm.

14. The filter of claim 11, wherein the CNTs define a plurality of apertures within a range from 5 nm to 500 nm.

15. The filter of claim 11, wherein the first metal comprises one of nickel and cobalt.

16. The filter of claim 11, wherein the metal substrate comprises one of a two-dimensional (2D) metallic mesh, a 2D metallic open cell foam comprising a 2D metallic mesh extended in a direction perpendicular to a 2D area defined by the 2D metallic mesh, and a three-dimensional (3D) metallic open cell foam.

17. The filter of claim 11, wherein the metal substrate is configured to allow the gas to pass through the apertures substantially without a pressure difference from one side of the filter relative to another side of the filter.

18. A method of detecting a pathogen, the method comprising:
    capturing a pathogen via a filter from a volume of gas flowing through the filter, the filter comprising:
      a metal substrate defining a plurality of apertures configured to allow the gas to pass through the apertures, the metal substrate comprising a metal alloy, the metal alloy comprising a first metal and a second metal; and
      a plurality of carbon nanotubes on a surface of a first phase precipitated out from a second phase of the of the metal alloy, the plurality of carbon nanotubes configured to capture a pathogen, wherein the first phase comprises a gamma prime phase of nickel or cobalt, wherein the gamma prime phase of the nickel or the cobalt is part of a structure of the metal substrate; and detecting, via a detector, the at least one pathogen captured by the filter.

19. The method of claim 18, wherein the metal substrate is configured to allow the gas to pass through the apertures substantially without a pressure difference from one side of the filter relative to the other side of the filter.

20. The method of claim 19, further comprising:

heating the metal substrate so as to destroy the pathogen captured by the filter.

* * * * *